United States Patent [19]

Schneider

[11] 4,253,051
[45] Feb. 24, 1981

[54] PHASE LOCKED LOOP HAVING ELECTRICAL ZEROING

[75] Inventor: Rudy L. Schneider, Santa Clara, Calif.

[73] Assignee: Carco Electronics, Menlo Park, Calif.

[21] Appl. No.: 938,595

[22] Filed: Aug. 31, 1978

[51] Int. Cl.³ .......................................... G05B 23/275
[52] U.S. Cl. ................................... 318/632; 318/608; 324/83 FE
[58] Field of Search ....................... 318/603, 632, 608; 324/83 D, 83 FE

[56] References Cited

U.S. PATENT DOCUMENTS

| | | | |
|---|---|---|---|
| 3,668,377 | 6/1972 | Inaba et al. | 318/632 X |
| 3,689,821 | 9/1972 | Slawson | 318/632 |
| 3,889,169 | 6/1975 | Hirschman et al. | 318/608 X |
| 3,893,011 | 7/1975 | Inaba et al. | 318/632 X |
| 4,025,839 | 5/1977 | Maury | 318/632 |

OTHER PUBLICATIONS

IBM Tech Disclosure Bulletin, vol. 18, No. 7, Dec. 1975, pp. 2317 & 2318.

Primary Examiner—B. Dobeck
Attorney, Agent, or Firm—Townsend and Townsend

[57] ABSTRACT

In apparatus for measuring the relative position between a fixed member and a movable member, as in a flight simulator, means for electrically offsetting the position measurement to compensate for mechanical offsets and the like. The relative position may be extracted by applying reference oscillator signals to a stator winding, thereby inducing a signal in a rotor winding. The rotor signal is communicated to a digitally closed phase lock loop including a phase detector, an integrator, a loop filter, a voltage controlled oscillator, and a frequency divider having a counter. The invention provides value setting means such as thumbwheel switches, and comparison means coupled between the value setting means and the frequency divider counter, for generating a pulse signal when the counter contents corresponds to the value set in the value setting means. This varies the timing of the feedback in the loop and allows an arbitrary number to be present in the counter at a particular time in the reference oscillator cycle. To avoid spurious pulses in the feedback loop, the feedback signal is synchronized to a fixed point in the cycle of the voltage controlled oscillator output which occurs generally in the middle of the pulse from the comparison means.

16 Claims, 10 Drawing Figures

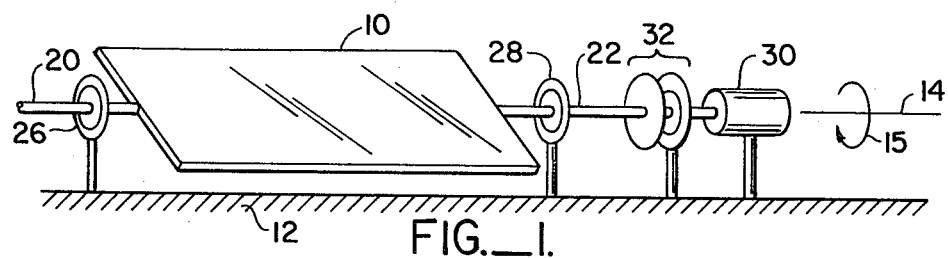
FIG._1.
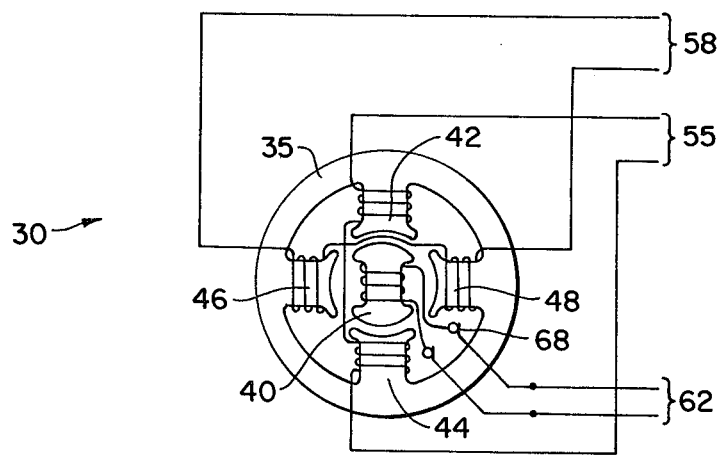
FIG._2.
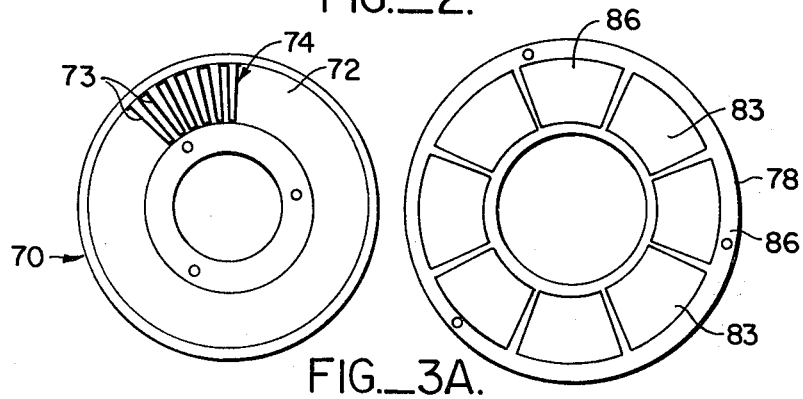
FIG._3A.
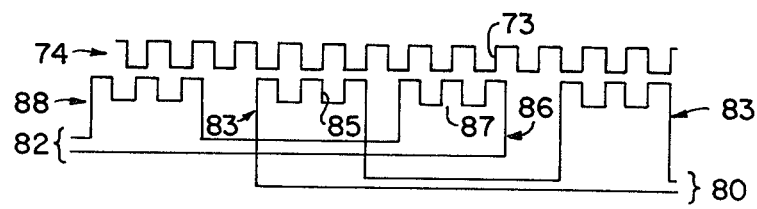
FIG._3B.

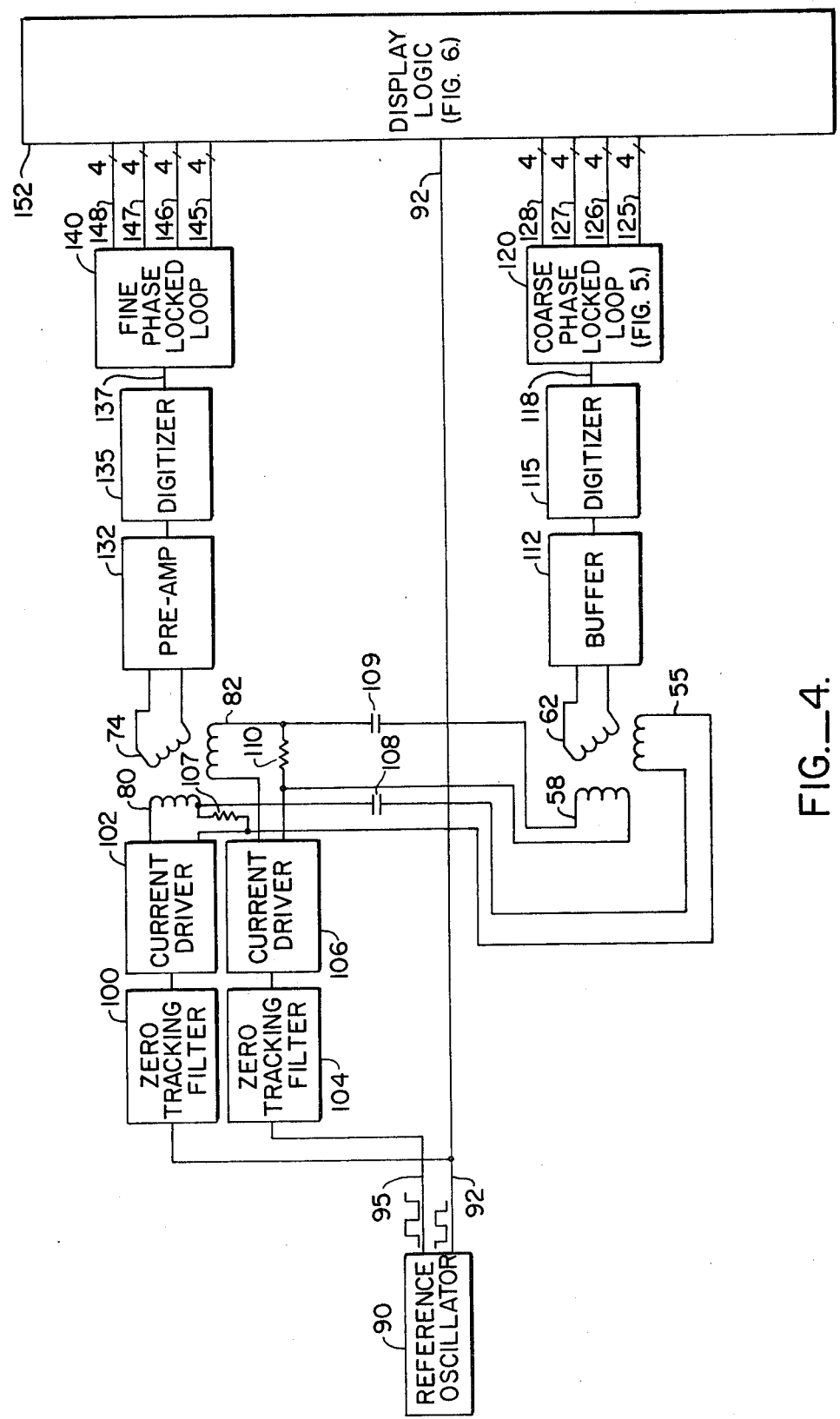
FIG._4.

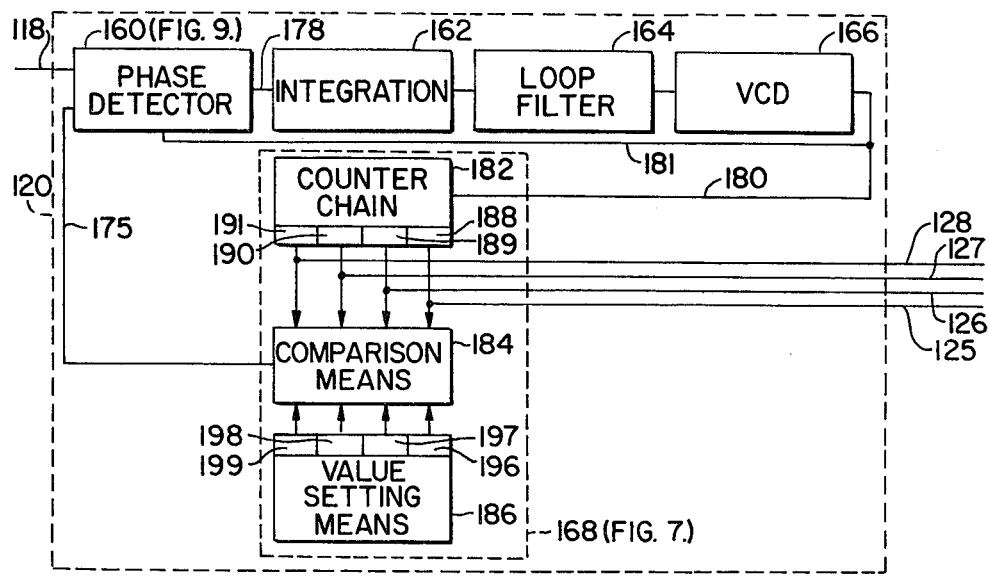
FIG._5.
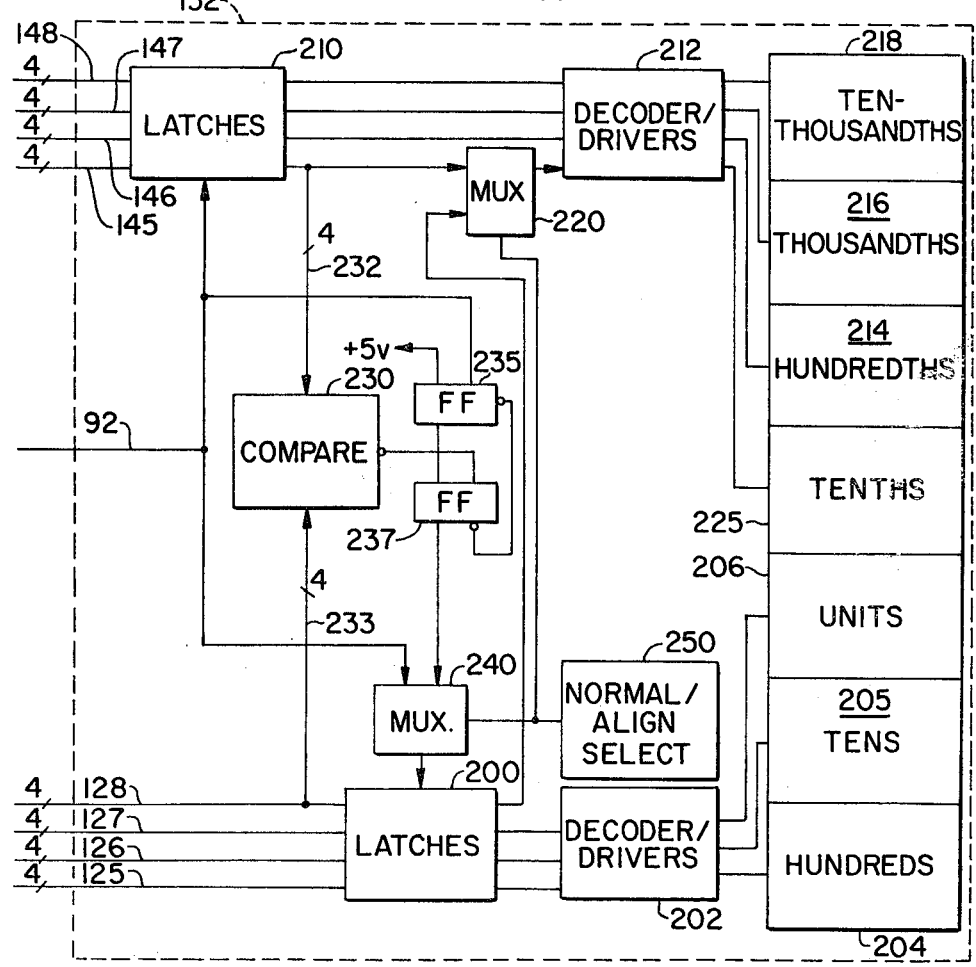
FIG._6.

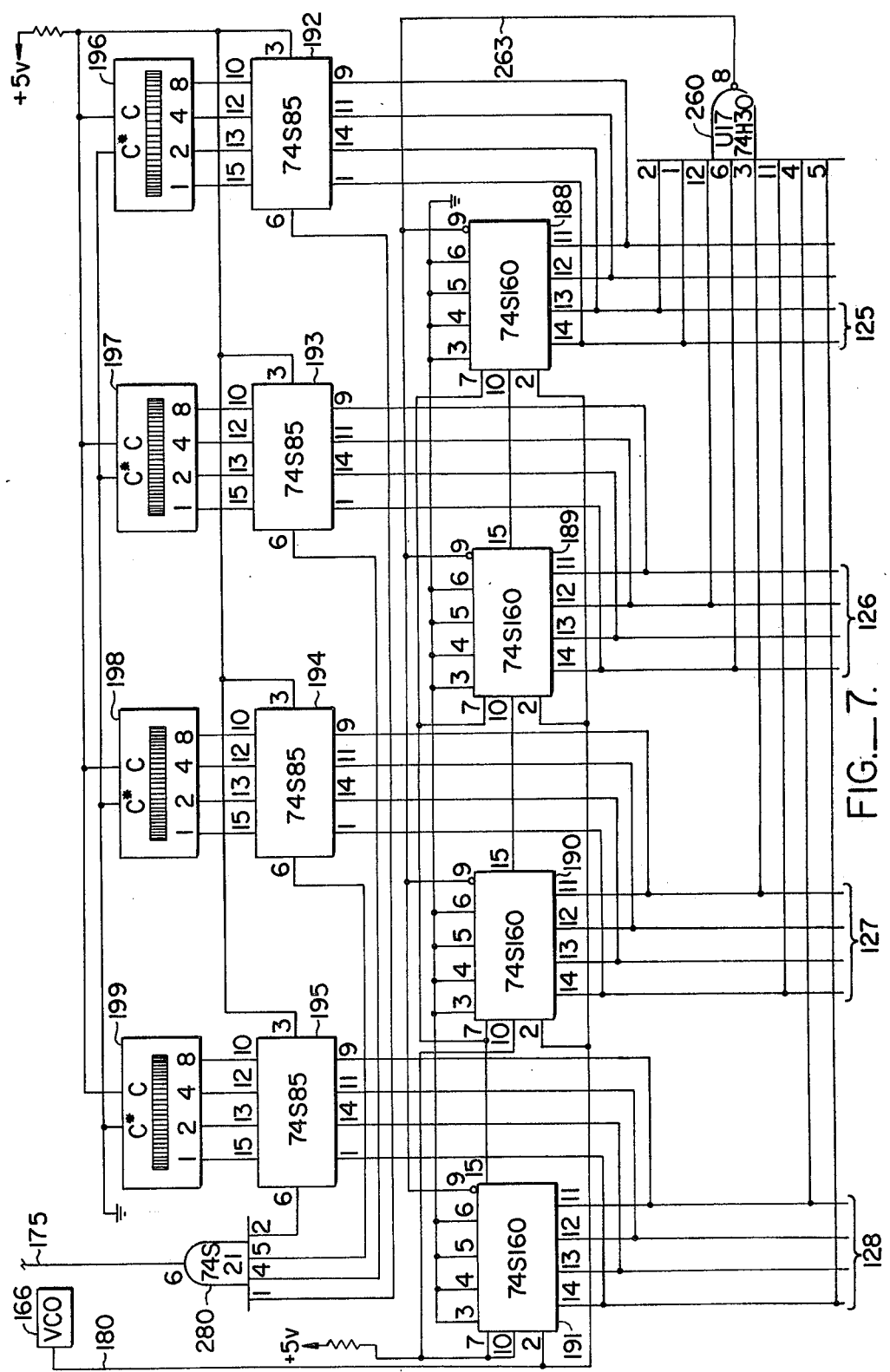
FIG._7.

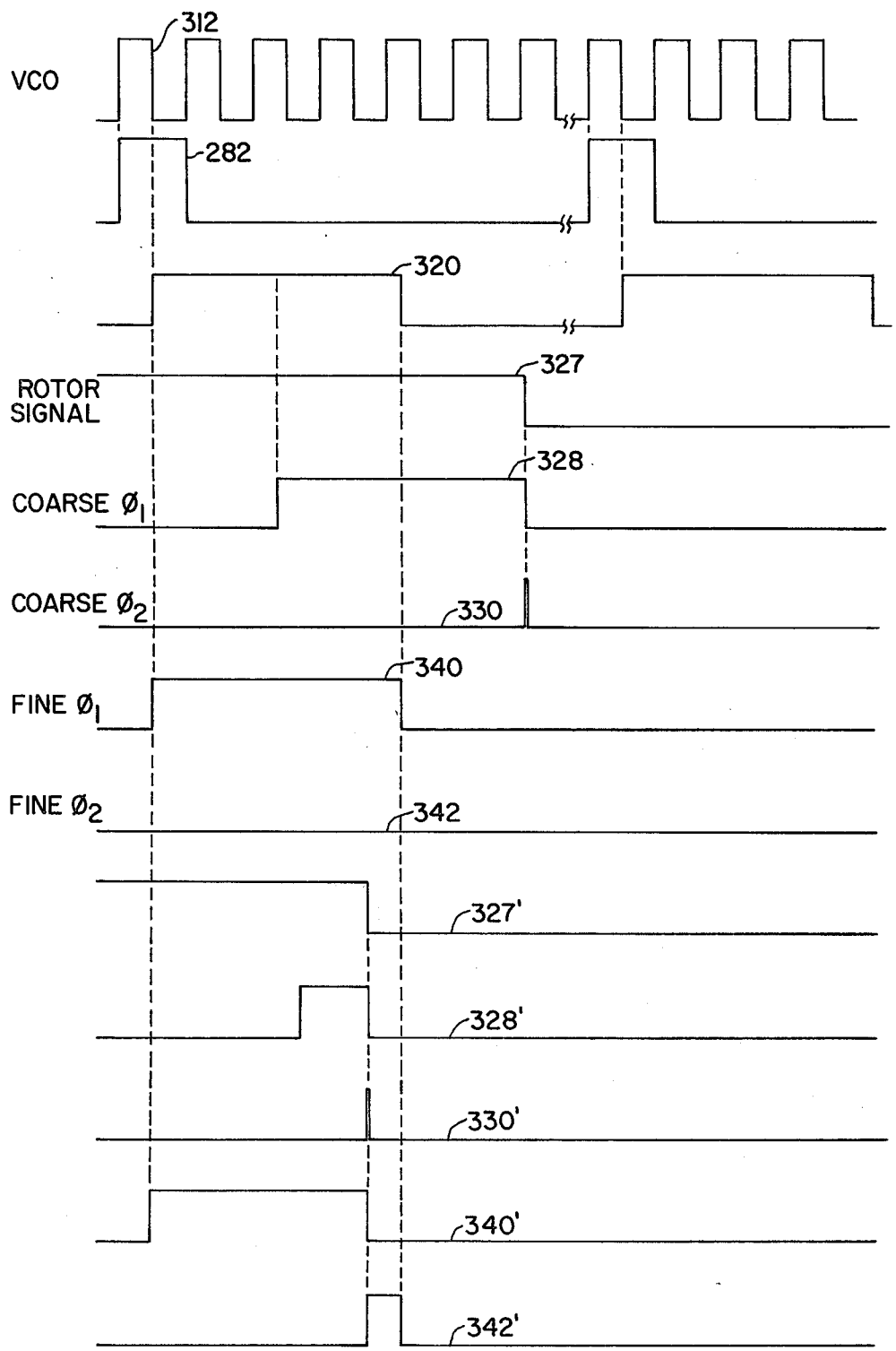
FIG._8.

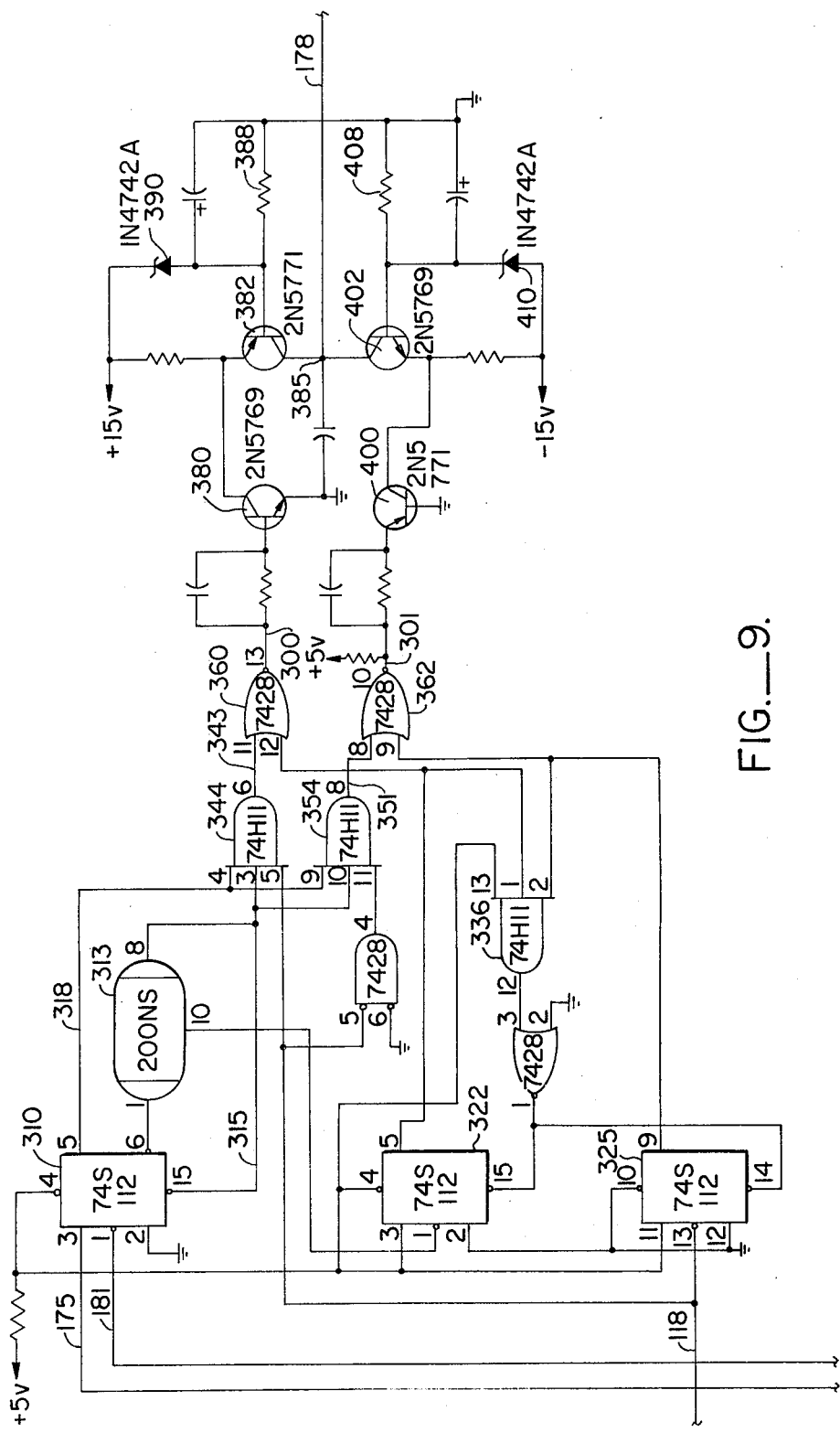
FIG._9.

PHASE LOCKED LOOP HAVING ELECTRICAL ZEROING

This invention relates generally to improvements in apparatus used to measure the relative position between a fixed member and a movable member as in a flight simulator. This invention relates more specifically to improvements in position control systems incorporating digitally closed phase locked loops as used in such measurements.

BACKGROUND OF THE INVENTION

A flight simulator is an example of a device where the position of a movable element relative to a fixed element must be measured very accurately. While the movement in a flight simulator is rotational, other devices may generate linear displacements.

A flight simulator provides a platform supported in a gimballed arrangement, so that the platform may be rotated about two or three axes. A control system for rotation about one of the axes typically includes driving means such as a torquer, and position sensing means, such as a resolver, the output of which is fed back to control the driving means. This invention relates to improvements in the position sensing means.

The position sensing means typically includes a stator, a rotor inductively coupled to the stator, means for exciting the stator, and means for detecting the induced signal in the rotor. The relative phase between the stator and rotor signals is representative of the relative displacement between the stator and rotor. A known way of measuring the phase difference is to generate pulses at a frequency that is a fixed factor multiple of the rotor output signal frequency. The number of pulses occurring between corresponding points in the stator and rotor signal cycles, divided by the fixed factor, gives the fraction of a cycle that the two signals are out of phase.

The frequency multiplication may be accomplished by a digitally closed phase locked loop, which includes a phase detector, an integrator, a voltage controlled oscillator (hereinafter designated VCO), and a frequency divider with a fixed divisor corresponding to the multiplication factor that is to be generated. The rotor output signal provides a reference frequency which is applied to a first input of the phase detector. The phase detector generates phase error pulses which are integrated and filtered, the resultant voltage being applied to the VCO. The VCO output is applied to the frequency divider, the divider typically comprising a counter which cyclicly generates a signal when it has counted a number of pulses equal to the multiplication factor and starts counting again from zero. This signal typically occurs at the transition to zero of the most significant bit of the most significant digit of the counter. The frequency divider output is applied to a second input of the phase detector to close the loop. The output of the VCO is therefore driven to and maintained at a frequency that is the required multiple of the rotor output frequency. Moreover, the output from the counter is phase locked to a particular point in the rotor signal cycle, the particular point being in part a function of the phase detector design.

It is known in the art to provide two separate measurements of the relative rotation between the rotor and the stator, the first measurement being a "coarse" number and the second measurement being a "fine" number. Each requires a separate resolver and phase locked loop. The coarse number is capable of defining the position within the entire expected range, while the fine number defines positions within a range that is much narrower. For example, a two-pole resolver generates a 360° phase shift between the stator excitation signal and the rotor output signal for every 360° of relative mechanical rotation, and is suitable for extracting the coarse number. A 720-pole resolver produces an electrical phase shift of 360° for every 1° of relative mechanical rotation, and may be used to extract the fine number. Using a coarse number divisor of 3600 and a fine number divisor of 10,000 gives a coarse number that is generally accurate to 0.1° over a 360° range and a fine number that is accurate to 0.0001° over a 1° range.

In order to display the measured relative position, the coarse and fine numbers are displayed by latching the contents of the counters in the coarse and fine phase locked loop frequency dividers. In the above example, the coarse and fine numbers both contain digits corresponding to 0.1°. This fine number tenths digit is the more accurate one. However, due to inaccuracies in the coarse resolver excitation, the coarse number should be offset with respect to the fine number. In other words, the coarse information should *not* be latched at the same time.

If the tenths digit of the coarse counter and the tenths digit of the fine counter at the same time were set equal, as the rotors were rotated around the full 360°, the tenths digit of the coarse and fine latched data would change relative to one another, with a typical error being ±0.2°. For example, if the fine number at 359° read 0.0000 and the coarse number read 358.8, latching both at the same time would give 358.0000° rather than the correct 359.0000°. Therefore, the tenths digit of the coarse number is purposely offset by −0.5° (±0.2°) so that once the fine data has been latched into the display, the coarse data is allowed to "catch up" to the same number in the tenths digit as the fine latched data. The coarse data should be latched into the display once its tenth digit becomes equal to the fine data tenths digit, at which time the complete angular position data displayed is accurate.

The phase locked loop described above has certain properties that have in the past hindered the usefulness of the technique. The frequency divider in the fine number phase locked loop performs a division that is typically by a factor of 10,000 to provide in conjunction with a 720-pole resolver a precision of 0.0001°. That is, the divider chain comprises a counter that counts the VCO pulses and generates the feedback signal after 10,000 pulses have occurred. Thus, the number in the counter at a fixed point in the stator cycle is, to within an additive constant, the fine number. However, when the mechanical apparatus is installed and levelled, the reading at zero angle is typically nonzero. In order to get an electrical zero to the precision of 0.0001°, it would be necessary to observe the counter content at the point where a zero reading is desired, and to eliminate this content by rotating the stator up to 0.5° to a precision of 0.0001° and bolting it down to within 0.0002 inches concentricity. As a practical matter, such an exact mechanical adjustment of the apparatus to achieve an electrical zero is impossible.

In the past, the practice has been to accept the inability to electrically zero the readout as inevitable, and to merely compensate for it in subsequent measurement and computations. As an example, the apparatus would be characterized by a fine number offset (and perhaps a coarse number offset), which would be subtracted out in order to obtain the correct angular measurements. The offsets have to maintain the relative offset of −0.5° to provide a proper combination of the coarse and fine numbers.

SUMMARY OF THE INVENTION

The present invention provides apparatus which allows a user to electrically zero the number that is output from a phase locked loop (coarse or fine number) without requiring painstaking mechanical adjustment of the resolver components. The invention also allows a user to achieve an electrical zero (or any other desired number) for any arbitrary mechanical orientation of the resolver components. Moreover, any desired relative offset between coarse and fine numbers may be readily achieved.

In addition to the standard components of a digitally closed phase locked loop, namely a phase detector, an integrator, a loop filter, a VCO, and a frequency divider, the present invention includes value setting means for generating a binary code representative of a numerical value set by a user, and comparison means. In a preferred embodiment the value setting means comprises a plurality of thumbwheel switches. The comparison means is coupled between the value setting means and the frequency divider counter, and generates a pulse signal when the counter contents correspond to the value set by the user. This signal is fed to the phase detector. Since prior art phase locked loops generated their feedback signal on the basis of a single bit transition, it was acceptable to lock this feedback signal itself to the rotor signal. However, in the present invention, the feedback signal is generated on the basis of multiple digit transitions being gated together. Since all the digits in the counter may not make their transitions simultaneously, a skewing which could generate spurious pulses may occur. The loop would then try to lock onto these pulses, with resultant instability and loss of accuracy. It has been found that reliable operation can be achieved by synchronizing the feedback to a fixed point (such as the falling edge) in the cycle of the VCO pulse that occurs generally in the middle of the pulse from the comparison means.

By the expedient of setting the value setting means to a code representative of the mechanical adjustment that would be required to electrically zero the apparatus, which value is readily determined by obtaining a reading with the value setting means set to zero, electrical zeroing of the apparatus is possible. The relative offset between the fine and coarse numbers is readily achieved by setting the coarse number value setting means without having to make mechanical adjustments.

For a further understanding of the nature and advantages of the invention, reference should be had to the ensuing detailed description taken in conjunction with the accompanying drawings.

BRIEF DESCRIPTION OF THE DRAWINGS

FIG. 1 is a perspective schematic illustrating the configuration of dual resolvers for providing a fine number and a coarse number in accordance with the present invention;

FIG. 2 is a schematic elevational view illustrating a two-pole resolver suitable for generating a signal from which the coarse number may be extracted;

FIG. 3a illustrates the construction of a 720-pole resolver suitable for generating a signal from which the fine number may be extracted;

FIG. 3b illustrates schematically the relationship between the stator windings and the rotor winding in the resolver of FIG. 3a;

FIG. 4 is a block diagram of the electronic measurement system of the present invention;

FIG. 5 is a block diagram of a phase locked loop suitable for extracting the coarse and fine numbers;

FIG. 6 is a block diagram of circuitry suitable for displaying the coarse and fine numbers;

FIG. 7 is a circuit schematic of a frequency divider for a phase locked loop incorporating the present invention;

FIG. 8 is a timing diagram illustrating the relationship between various signals in the phase detector; and FIG. 9 is a circuit schematic of a phase detector suitable for use with the present invention.

DETAILED DESCRIPTION OF THE INVENTION

A flight simulator is an example of a device wherein it is necessary to accurately measure the rotational displacement of one element relative to another. FIG. 1 illustrates schematically a single axis device having resolvers for providing signals from which may be extracted a coarse and a fine number representative of the angular displacement. A platform 10 is mounted for rotation relative to a structure 12, the rotation occurring about an axis 14 as indicated by arrow 15. Platform 10 has oppositely extending collinear shafts 20 and 22 which are journalled within bearings 26 and 28 for rotation about axis 14. Bearings 26 and 28 are fixed to structure 12. It should be understood that in a multiple axis device, structure 12 would itself be mounted to a further structure for rotation about an axis perpendicular to axis 14 so that platform 10 could assume angular inclinations according to one or two further angular degrees of freedom. Shaft 22 is coupled to a coarse number resolver 30 and a fine number resolver 32. These resolvers are standard articles of manufacture, and will be described only briefly to avoid prolixity. In the preferred embodiment, resolvers 30 and 32 are two-pole and 720-pole devices respectively and provide angular measurements over ranges of 360° and 1°, respectively.

FIG. 2 is a schematic view of two-pole resolver 30 suitable for measuring relative rotation over a range of 360°. An example of such a resolver is a type 11R2N4r100x synchro resolver manufactured by Singer Co. Resolver 30 comprises a stator 35 and a rotor 40 which are relatively rotatable. Stator 35 comprises a first bifurcated pole having segments 42 and 44, and a second bifurcated pole perpendicular to the first bifurcated pole and having segments 46 and 48. The first pole has a winding 55, the second pole has a winding 58, and rotor 40 has a winding 62. Stator 35 is mounted to structure 12, while rotor 40 is mounted to shaft 22 and is thus rotatable about axis 14. Rotor winding 62 communicates to fixed apparatus via a slip ring arrangement 68.

In operation, a first sinusoidal signal is applied to winding 55, and a second sinusoidal signal is applied to winding 58. The second signal has an amplitude and frequency equal to those of the first and a phase that is displaced by 90° relative to that of the first. Accordingly, a signal is induced in winding 62, the signal being a superposition of the signals in windings 55 and 58, the precise combination being a function of the angle of rotor 40 relative to stator 35. In particular, the resolver is designed so that the proportionality constants are sin $\theta$ and cos $\theta$ where $\theta$ is the angle between rotor winding 62 and stator winding 58, so that the signal induced in rotor winding 62 has a frequency and amplitude that are independent of the relative angle between rotor 40 and stator 35, and a phase that is shifted relative to the signal on stator winding 55 by an amount corresponding to the relative angle between rotor 40 and stator 35.

FIGS. 3a and 3b are schematic views of the rotor and stator of 720-pole resolver 32 for measuring relative rotation over a range of 1°. A suitable resolver of this type is manufactured by Farrand Controls, Inc. of Valhalla, N.Y., and marketed under the registered trademark INDUCTOSYN. Rotor 70 comprises an insulating disc 72 on which are deposited 720 series connected radial conductors 73 in the form of hairpin turns, thereby defining a rotor winding 74. Conductors 73 are spaced within an annular band at a uniform angular interval of 0.5°. For clarity, FIG. 3a shows a larger angular interval.

Stator 71 comprises an insulating disc 78 on which are deposited radial conductors to define first and second stator windings 80 and 82. Stator winding 80 includes a first group of stator winding segments 83 (shown only in outline), each of which extends over an angular range within an annular region on disc 78, with adjacent segments 83 being spaced from each other by an angle slightly larger than the angular range. Each stator winding segment 83 includes a plurality of series connected radial conductors 85 which are disposed at 0.5° intervals over their angular range. Again, for clarity, the angular range is exaggerated. Stator winding segments 83 are themselves series connected to define first stator winding 80. In a like fashion, second stator winding 82 includes a second group of stator winding segments 86, comprising radial conductors 87, segments 86 being substantially identical to first stator winding segments 83. Segments 86 are disposed in the gaps between segments 83 to substantially fill the annular region on stator disc 78. The relationship of stator winding conductors 85 to stator winding conductors 87 is best understood in terms of the relationship between stator windings 85 and 87 to rotor winding 74 when rotor 70 and stator 71 are in a confronting position. First stator winding segments 83 are disposed so that when one of conductors 85 is directly opposite one of rotor conductors 73, each other conductor 85 is directly opposite another corresponding rotor conductor 73. Conductors 87 of stator winding 82 are displaced relative to conductors 85, so that in the above position, each conductor 87 is substantially exactly halfway between two of rotor conductors 73. Thus when respective conductors of windings 80 and 74 are directly overlying, the respective conductors of windings 82 and 74 are in exactly staggered relationship. This relationship is shown schematically in FIG. 3b where the windings are shown for clarity as facing one another rather than in an overlying relationship.

In operation stator winding 80 has applied to it a first sinusoidal signal and stator winding 82 has applied to it a second sinusoidal signal that is 90° out of phase with the first signal. A signal is induced in rotor winding 74 that is a superposition of the two stator signals. Maximum coupling between the rotor winding and one of the stator winding occurs when the respective radial conductors are in directly overlying relationship, while minimum coupling occurs when the respective radial conductors are in a substantially staggered relationship. As rotor 70 is displaced by an angle which corresponds to twice the angular separation between adjacent conductor segments 73, a complete 360° phase shift in the signal induced in rotor winding 74 occurs. Accordingly, a complete electrical cycle of phase shift occurs for a 1° mechanical rotation of rotor 70 with respect to stator 71.

It can thus be seen that the signals induced in the rotors of resolvers 30 and 32 undergo an electrical phase shift relative to the signal in one of each of the respective stator coils over widely different angular ranges. In particular, the phase of the signal in the rotor winding of resolver 30 shifts a complete electrical cycle for a 360° mechanical rotation of platform 10 while the phase of the signal in the rotor winding of resolver 32 undergoes a phase shift of a complete electrical cycle for a 1° mechanical rotation of platform 10.

FIG. 4 is a schematic block diagram illustrating the extraction of coarse and fine number information from the signals induced in the rotors of resolvers 30 and 32. A reference oscillator 90 produces first and second square waves on output lines 92 and 95, the signals on lines 92 and 95 being at precisely the same frequency (3.6 kHz in the preferred embodiment) and having a relative phase difference of precisely 90°. The signal on line 92 is fed through a zero tracking filter 100 and a current driver 102 to stator winding 80. In a like fashion, the signal on line 95 is fed through a zero tracking filter 104 and a current driver 106 to stator winding 82. The zero tracking filters and current drivers thus provide sinusoidal signals in precise phase relationship to the square wave signals on lines 92 and 95, and therefore excite stator windings 80 and 82 in precise 90° phase relationship to one another. Stator winding 80 has a 1 ohm sampling resistor 107 in series, and stator winding 55 is connected across resistor 107. A blocking capacitor 108 is connected in series with stator winding 55. Analagously, the series combination of stator winding 58 and a blocking capacitor 109 is connected in parallel with a 1 ohm sampling resistor 110, resistor 110 being connected in series with stator winding 82.

The sinusoidal signal induced in rotor winding 62 is passed through a buffer 112 and a digitizer 115. Digitizer 114 preferably incorporates a zero crossing detector to produce an output signal on line 118 that is a square wave in precise phase relationship to the sinusoidal rotor signal. The signal on line 118 is applied as a reference frequency to a coarse phase locked loop 120, the structure and operation of which will be described in detail below. Coarse phase locked loop incorporates a counter chain which provides binary codes (preferably binary coded decimal codes) of the digits corresponding to the coarse number on data lines 125, 126, 127, and 128. To accommodate a maximum coarse number of 359.9, data line 125 is a two-bit line, while data lines 126–128 are each four-bit lines.

The signal induced in rotor winding 74 is amplified by a preamplifier 132 such as a fixed gain wide band width operational amplifier which is preferably situated proximate fine number resolver 32. The amplifier signal is applied to a digitizer 135 to provide a square wave output on a line 137, which signal is applied as a reference frequency to a fine phase locked loop 140. Fine phase locked loop 140, like coarse phase locked loop 120, incorporates a counter chain which provides fine number information on four four-bit data lines 145, 146, 147, and 148, to provide a maximum fine number reading of 0.9999.

The binary codes on data lines 125-128 and 145-148 are applied to a display logic network 152 along with the square wave signal on line 92 from reference oscillator 90. A description of the structure and operation of display logic 152 is best deferred until the basic structure and operation of phase locked loops 120 and 140 is set forth.

FIG. 5 is a block diagram illustrating coarse phase locked loop 120. Further details may be seen in FIGS. 7 and 9. Fine phase locked loop 140 is generally the same in structure and operation. The purpose of phase locked loop 120 is the generation of pulses at a frequency that is a fixed factor multiple of the frequency of rotor signal pulses coming in on line 118. For coarse phase locked loop 120 in cooperation with two-pole resolver 30, this fixed factor is 3600. The generated pulses, in addition to being at a multiplied frequency relative to the rotor signal pulses on line 118 are maintained in a precise phase relationship relative to the rotor signal pulses. As will be described below, in the preferred embodiment, the generated pulses are timed such that the falling edge of one of the generated pulses produces a 200 nanosecond pulse whose center is to be phase locked to the falling edge of a rotor signal pulse on line 118. The number of these generated pulses occurring during the interval between fixed points in the cycles of the reference oscillator signal on line 92 and the rotor signal on line 118 varies linearly with the phase difference between the two signals. Since, as discussed above, the phase difference between the signals varies linearly with the relative rotational position of the rotor 50 and stator 40, it can be seen that the number of pulses counter varies linearly with the rotational position, with each additional pulse in the interval indicating an additional angular displacement of 0.1°.

Broadly, phase locked loop 120 comprises a phase detector 160, an integrator 162, a loop filter 164, a voltage controlled oscillator 166 (hereinafter designated VCO), and a frequency divider 168, all cyclically coupled. Pulses on line 118 are communicated to a first input of phase detector 160. Frequency divider 168 generates pulses on a line 175 that are communicated to a second input of phase detector 160. As will be discussed below, an initial phase error between the rotor pulses on line 118 and the feedback pulses on line 175 causes phase detector 160 to generate pulses on an output line 178, which pulses when integrated by integrator 162, and filtered by loop filter 164 produce a change in output voltage. This output voltage is applied to VCO 166 which generates square wave pulses on a line 180 at a frequency that varies in response to variations in the voltage from integrator 162 and filter 164. These pulses are communicated to frequency divider 168 on line 180. For the preferred type of phase detector, the VCO output is also communicated to phase detector 160 on a line 181. Frequency divider 168 includes a counter chain 182, comparison means 184, and value setting means 186. The VCO pulses on line 180 are fed to counter chain 182 which preferably includes four cascaded counters 188, 189, 190, and 191. Counter chain 182 counts pulses on line 180, and generates a sequence of binary codes on lines 125-128 corresponding to the contents of counters 188-191, respectively. Counter chain 182 repeatedly counts from 0000 to 3599 and then automatically resets itself to 0000. The counter contents are applied to a first set of inputs on comparison means 184 which preferably includes four comparators 192, 193, 194, and 195. Value setting means 186 preferably comprises a plurality of manually actuable thumbwheel switches 196, 197, 198, and 199 for generating a plurality of binary codes which are applied to a second set of inputs on comparators 192-195. When the number content of the counters 188-191 equals the number corresponding to the digits set on thumbwheels 196-199, respectively, comparison means 184 generates a pulse on line 175 which is applied to phase detector 160 in order to close the loop.

It should be understood that setting thumbwheels 196-199 to different values changes the number that appears on lines 125-128 at the time a pulse appears on line 175, but does not change the frequency multiplication on line 180. The multiplication is determined by the fact that counter chain 182 has a cycle of 3600 pulses before resetting.

As discussed above, the contents of counter chain 182, at a fixed point in the reference oscillator cycle is, to within an additive constant, the required coarse number sought to be extracted. Since the number on lines 125-128 at a fixed point in the rotor signal cycle depends on the setting of thumbwheels 196-199, it can be seen that an appropriate setting of thumbwheels 186 can provide any desired arbitrary number on lines 125-128 at a given fixed point of the reference oscillator cycle.

Fine phase locked loop 140 is essentially equivalent in structure and function to coarse phase locked loop 120, the main difference being that the counter chain in phase locked loop 140 is reset after 10,000 pulses (i.e., the counter chain counts from 0000 through 9999 before resetting to 0000), thereby resulting in a frequency multiplication of 10,000. A set of thumbwheels similar to thumbwheels 196-199 allows an arbitrary number to be present in the fine loop counter chain at a particular point in the cycle of the signal on line 137. Also note that gate 260 in FIG. 7 is not used for phase locked loop 140.

FIG. 6 is a block diagram showing display logic network 152. In general terms, the data from the phase locked loop counter chains is latched and displayed. The data on lines 125-128 from coarse phase locked loop 120 is communicated to a first set of latches 200. The latch outputs corresponding to data on lines 125-127 are communicated to a first set of decoder/drivers 202, and the corresponding driver outputs communicated to hundreds' display digit 204, tens' display digit 205, and units' display digits 206. Data on lines 145-148 from fine phase locked loop 140 is communicated to a second set of latches 210. The latch output corresponding to lines 146-148 is communicated to a second set of decoder/drivers 212 for driving hundredths' display digit 214, thousandths' display digit 216, and ten-thousandths' display digit 218.

Data on line 128 corresponds to the coarse number tenths digit while data on line 145 corresponds to the fine number tenths' digit. The fine number tenths' digit is the more accurate one. The respective latch outputs for data on these lines are fed to a multiplexer 220, the single output of which is fed to one of decoder/dividers 212 to drive tenths display digit 225. Multiplexer 220 thus selects whether the fine number or coarse number tenths' digit is to be displayed.

The fine number information is typically latched at the rising edge of the reference oscillator signal on line 92. However, the coarse information is not latched at the same time due to errors in the coarse resolver excitation. If the coarse number and the fine number were latched at the same time, coarse number tenths' digit (on line 128) and fine number tenths' digit (on line 145) would change relative to one another, with a typical error being ±0.2°. This error can not be overcome by latching the fine and coarse numbers at the same time and merely ignoring the coarse number tenths' digit. Rather, if the three most significant digits of the coarse number were displayed along with the entire fine number, an error of 1° could occur. For example, if the fine number at 359° read 0.0000 and the coarse number read 358.8, latching both at the same time would give 358.0000° rather than the correct 359.0000°. Therefore, the latched output corresponding to fine number tenths' digit is also communicated to one set of inputs on a comparator 230. The incoming coarse number tenths' digit on line 128 is communicated to a second set of inputs on comparator 230 via a line 233.

To ensure a proper combination of coarse and fine data, the tenths' digit of the coarse number is purposely offset by −0.5° so that when the fine data has been latched by latches 210, the coarse number tenths' digit counter has a smaller content. The coarse data is not latched until the same number appears in the tenths' digit of the coarse data counter chain as appears in the tenths' digit of the fine data latches. A signal from comparator 230, indicating that this has occurred, is fed to flip-flops 235 and 237, the output of flip-flop 237 being communicated to a multiplexer 240 as one data input. The reference oscillator signal on line 92 is communicated to multiplexer 240 as a second data input. The output from multiplexer 240 is communicated to latches 200 for the purpose of latching the data incoming on lines 125–128. Multiplexer 240 thus selects whether the coarse data is to be latched by the reference oscillator or by a signal from comparator 230.

A selector 250 communicates to a selection each of multiplexers 220 and 240, to permit alternate modes of operation. In the first mode, designated "normal" mode, multiplexer 220 communicates the latched fine data tenths' digit to a corresponding one of decoder drivers 212 while multiplexer 240 transmits the flip-flop output to latches 200 to effect latching. In the second mode, designated "align", mode multiplexer 240 communicates the reference oscillator signal to latches 200, thereby having the coarse and fine data latched at the same time, and multiplexer 220 communicates the latched coarse data tenths' digit to the one of decoder drivers 212 that drives tenths' display digit 225. It is only be seeing the tenths' digit in both of these modes, that the proper offset of −0.5° can be achieved by manipulation of the coarse data thumbwheels (assuming fine data thumbwheels 196–199 to have been set to give the desired readout). The offset will vary typically by ±0.2° over a complete rotation of rotor 40.

FIG. 7 is a circuit schematic of frequency divider 168. Counters 188–191 are preferably decade counters such as type 74160 (type 74S160 in the fine phase locked loop). Counters 188–191 are cascaded, with pulses on line 180 communicated to a clock input (pin 2) on each of the counters. A carry output (pin 15) from each of counters 188–191 is applied to a count enable input (pin 7 or 10) on counters 188–190, respectively. Data inputs (pins 3, 4, 5 and 6) on each of counters 188–191 are grounded so that the preset pulse at a load input (pin 9) on each counter will result in a resetting of all the counters to zero. An eight-input gate NAND 260 such as type 74H30 produces a preset pulse on a line 263 when the data on lines 125–128 corresponds to a value of 3599. The next pulse on line 180 then causes counters 188–191 to be preset to the zero level determined by the grounded data inputs. This latter arrangement is not needed in time phase locked loop 140 since the counters automatically reset to 0000 after 9999.

Each of thumbwheel switches 196–199 typically comprises ganged wipers and contact sets connected so that a rotation of a shaft causes the wipers to cause electrical connection between the wipers and various of the contacts to generate a binary code representative of the position. Each thumbwheel switch is connected to sources providing two logic levels, and generates a binary code of four output lines. A suitable set of four thumbwheel switches is part number 4A211056F, manufactured by EECO, Santa Ana, Calif., under the trade name "Stripswitch."

Comparators 192–195 are preferably four-bit magnitude comparators such as type 74S85. The outputs from counters 188–191 are communicated to first data inputs (pins 1, 14, 11, and 9) on comparators 192–195. The output from each of thumbwheel switches 196–199 is communicated to a second set of data inputs (pins 15, 13, 12 and 10) on each of comparators 192–195. A pulse occurs on an output (pin 6) of each comparator when the binary values of the two data inputs are equal. The output lines from comparators 192–195 are communicated to a four-input AND gate 280 which may be type 74S21.

FIG. 8 is a timing diagram illustrating the relative timing of a number of signals generated within the system of FIG. 4. A signal 282 appears on an output (pin 6) of AND gate 280 when a comparison between the contents of counters 188–191 agrees on a bit by bit basis with the values set in thumbwheels 194–197. Signal 282 is communicated to phase detector 160 on line 175. It can be seen that the logic level of signal 282 is high for the duration of a complete VCO pulse cycle on line 180, the leading edges of pulses on lines 180 and 175 being substantially simultaneous except for delays in the components.

FIG. 9 is a circuit schematic of phase detector 160. Broadly, phase detector 160 includes a digital portion for generating first and second phase error signals on a pair of lines 300 and 301, and a digital-to-analog conversion portion for driving current to integrator 162 on phase detector output line 178 in response to the signals on lines 300 and 301. Each of the phase error signals is itself a combination of a so-called fine phase error signal which has effect when the loop is nearly locked, and a so-called coarse phase error signal for generating large corrections. The terms "coarse" and "fine" in this context should not be confused with the coarse and fine numbers with their associated phase locked loops.

It is possible that line 175 will carry spurious pulses that arise from non-simultaneous transitions of the bits in counters 188–191 due to delays in the components. These pulses would occur close in time to the "ideal" counter transition. Accordingly, phase detector 160 is preferably constructed to be sensitive to signal 282 at a point removed from the counter transition, which point may be defined by a falling edge of VCO pulses communicated to phase detector 160 on line 181. This falling edge should fall near the middle of the pulse on line 175. (If there are no delays, the falling edge would be exactly at the middle).

Phase detector 160 includes three flip-flops and a number of gates. A first flip-flop 310, preferably a JK flip-flop such as type 74S112, is used to generate timing pulses for both the coarse and fine phase error signals. Comparator gate output signal 282 on line 175 communicates to a first input (pin 3) while a second input (pin 2) is grounded. VCO pulses on line 181 are used to clock flip-flop 310. A complementary output (pin 6) of flip-flop 310 is coupled to a 200 nanosecond delay line 313, the output of which is communicated on a line 315 to reset flip-flop 310. Accordingly, a signal 320 on a line 318 connected to the output (pin 5) of flip-flop 310 is produced, signal 320 being a pulse having a rising edge substantially in coincidence with the falling edge of the VCO pulse 312 that occurs during the time that comparator gate output signal 282 is high, and having a 200 nanosecond duration.

Second and third flip-flops 322 and 325 provide first and second coarse phase error signals 328 and 330. Each flip-flop has first and second inputs maintained at high and low levels, respectively. Flip-flop 322 is clocked by a signal from the center tap of delay line 313. Accordingly, signal 328 appears on the output (pin 5) of flip-flop 322, signal 328 having a rising edge that is 100 nanoseconds delayed relative to the rising edge of signal 320. Flip-flop 325 is clocked by the rotor signal pulse, designated 327, coming in on line 118, and more particularly by a falling edge thereof. Accordingly, signal 330 appears at an output (pin 9) of flip-flop 325 having a rising edge corresponding to the falling edge of rotor pulse 327. The output signals from flip-flops 322 and 325 are communicated to an AND gate 336, the output of which is inverted and communicated to flip-flops 322 and 325 in order to reset them. Accordingly, both signals 328 and 330 have substantially simultaneous falling edges, and depending on the relative timing of the falling edge of rotor signal 327 relative to the 100 nanosecond delayed output from delay line 312, one of signals 328 and 330 will be of very short duration, the duration being a function primarily of delays and rise times in the components themselves.

While coarse phase error signals 328 and 330 could properly serve as phase error signals, this is not desirable since one of them is of very short duration. The loop would tend to respond to this situation by overcorrecting so that flip-flops 322 and 325 would alternately put out substantial phase error correction pulses on alternating rotor pulses incoming on line 118. Accordingly, first and second coarse phase error signals 328 and 330 are combined with first and second fine phase error signals 340 and 342 that dominate when a phase locked condition is approached. First fine phase error signal 340 is produced on a line 343 connected to the output of a three-input AND gate 344, into which are communicated signal 320 from flip-flop 310, rotor signal 327, and the output signal from 200 nanoseconds delay line 313. Second fine phase error signal 342 is produced on a line 351 connected to the output from a three-input AND gate 354, into which are communicated signal 320, a signal that is the complement of rotor signal 327, and the output signal from delay line 313. Signals 328 and 340 are fed to a NOR gate 360 while signals 330 and 350 are fed to a NOR gate 362, to produce first and second inverted phase error signals on lines 300 and 301. AND gates 336, 344, and 354 may be type 74H11. NOR gates 360 and 362 may be type 7428.

Fine phase error signals 340 and 342 are mutually exclusive and are confined to the 200 nanosecond duration defined by signal 320. FIG. 8 illustrates a condition where the falling edge of rotor signal 327 is well outside the 100 nanosecond interval. Under those conditions first fine phase error signal 340 is high during the entire 200 nanosecond interval while second fine phase error signal 342 is low. Moreover, coarse phase error signal 320 is high for an interval that may be much longer than 200 nanoseconds. FIG. 8 also illustrates a condition in which the rotor pulse has a falling edge within the 200 nanosecond interval. This situation is represented by signals 327', 328', 330', 340' and 342' corresponding to signals 327, 328, 330, 340, and 342, respectively. Here, fine phase error signals 340' and 342' dominate coarse phase error signals 328' and 330'. Each of signals 340' and 342' is high for respective complementary portions of the 200 nanosecond interval, the portions becoming equal in length when the falling edge of signal 327' is centered in the 200 nanosecond interval.

First inverted phase error signal on line 300 is communicated to a complementary pair of transistors including an NPN transistor 380 and a PNP transistor 382. The signal is input to the base of transistor 380, the emitter of which is grounded. The collector of transistor 380 is coupled to the emitter of transistor 382, the collector of which is coupled to a conduction point 385 on line 178. The base of transistor 382 is maintained at a level of 3 volts by a 150 ohm resistor 388 to ground and a 12 volt Zener diode 390 which is connected to a +15 volt supply. Second inverted phase error signal on line 301 communicates to a complementary pair of transistors including a PNP transistor 400 and an NPN transistor 402. The signal communicates to the emitter of transistor 400, the base of which is grounded. The collector of transistor 400 is coupled to the emitter of transistor 402, the collector of which is coupled to conduction point 385 on line 178. The base of transistor 402 is maintained at −3 volts by a 150 ohm resistor 408 to ground and a 12 volt Zener diode 410 to a −15 volt supply. Transistors 380, 382, 400, and 401 are preferably high speed switching transistors of complementary configuration NPN transistors 380 and 402 may be type 2N5769 while PNP transistors 382 and 400 may be type 2N5771. Zener diodes 390 and 410 may be type 1N4742A.

When the level on line 300 goes low, corresponding to the presence of a high level of either signal 328 or 340, transistor 380 is turned off, and transistor 382 is turned on. Similarly, when the level on line 301 becomes low, corresponding to a high level of either signal 330 or signal 360, transistor 400 is turned off, and transistor 401 becomes conducting. Since the phase error signals are mutually exclusive, only one of transistors 382 and 402 will be conducting at a given time. When transistor 382 is conducting, current flows into integrator 162, while when transistor 402 is conducting, current flows from integrator 162 on line 178.

The construction of integrator 162, loop filter 166, and VCO 166 is a matter of ordinary design skill, and will be only briefly discussed. Integrator 162 includes an operational amplifier 420 with resistance as well as capacitance in the portion of the circuit. If the resistance were absent, the amplifier would integrate the high frequencies rather than providing gain for them which would result in oscillation and an inability to achieve a phase locked condition in the loop. Loop filter 164 is a two pole low pass filter.

VCO 166 may incorporate a type MC1648 oscillator manufactured by Motorola, and variable capacitance tuning diodes such as type IN5473A as part of an inductance/capacitance tank circuit, so that the oscillator frequency will vary with the capacitance of the tuning diodes which is itself controlled by the voltage input to VCO 166 from integrator 162 and loop filter 164. The output from the oscillator is preferably passed through a DC isolation capacitor to a zero cross detector such as a type NE527, manufactured by Signetics, to generate a square wave signal in precise phase and frequency relation to the oscillator sinusoidal signal. The VCO output signal is passed to counter chain 182 as described above.

In order to insure that the falling edge of a VCO pulse falls within the interval during which the level on line 175 is high, given delays in the circuitry, an extra inverter on line 181 may be employed in the fine phase locked loop.

I claim:

1. In a phase locked loop for receiving a first pulse train and generating a second pulse train at a frequency that is a fixed factor multiple of a first pulse train and in a predetermined phase relationship thereto, including phase detection means having a first input to which the first pulse train is applied, integration means, voltage controlled oscillator means and frequency division means including a counter, the frequency division means communicating a signal to a second input of the phase detection means, the phase detection means being responsive to a predetermined portion of the signal, the improvement comprising:

means for varying the relative time in the first pulse train cycle at which the predetermined portion of the signal is communicated to the phase detection means, such that the number in the counter at an arbitrary desired point in the first pulse train cycle can be varied to provide a desired value.

2. The invention of claim 1 wherein the means for varying the relative time comprises:

value setting means for generating a binary code representative of the arbitrary desired point in the first pulse train cycle and the desired value; and comparison means coupled to the value setting means and to the counter for producing the predetermined portion of the signal in response to a correspondence between the content of the counter and the binary code of the value setting means, the predetermined portion of the signal being communicated to the second input of the phase detector.

3. The invention of claim 2 wherein the value setting means comprises a manually actuable switch having a plurality of positions and a plurality of output lines, each position resulting in a binary code on the output lines corresponding to the position.

4. In apparatus for measuring the relative position between a fixed member and a movable member, the apparatus including means for generating first and second cyclical electrical signals wherein the phase difference between the first and second cyclical signals affords a measure of the relative position, and digitally closed phase locked loop means having phase detection means, integration means, voltage controlled oscillator means, and frequency division means including a counter, the second cyclical signal being applied to a first input of the phase detection means wherein the number of pulses generated by the voltage controlled oscillator means between fixed points in the cycles of the first and second cyclical signals is representative of the phase difference, means for providing a zero reading for a fixed arbitrary relative displacement between the fixed and movable members comprising:

value setting means for generating a binary code representative of the arbitrary displacement; and comparison means coupled to the value setting means and to the counter for producing a signal in response to a correspondence between the content of the frequency divider counter and the binary code of the value setting means, the signal being communicated to a second input of the phase detection means.

5. The invention of claim 4 wherein the value setting means comprises a manually actuable switch having a plurality of positions and a plurality of output lines, each position resulting in a binary code on the output lines corresponding to the position.

6. In a phase locked loop for generating pulses at a frequency that is a fixed factor multiple of a reference frequency pulse train, the phase locked loop including phase detection means having a first input to which is communicated the reference frequency pulse train, integration means, voltage controlled oscillator means, and frequency division means including a counter, means for providing a zero reading in the counter at a fixed arbitrary point in the cycle of the reference frequency pulse train comprising:

value setting means for generating a binary code; and comparison means coupled to the value setting means and to the frequency divider counter for producing a signal when the content of the frequency divider counter and the binary code of the value setting means are equal, the signal being applied to a second input of the phase detector such that the phased locked loop maintains the signal in a fixed phase relationship to the reference frequency pulse train.

7. The invention of claim 6 wherein the value setting means comprises a manually actuable switch having a plurality of positions and a plurality of output lines, each position producing a binary code on the output lines corresponding to the position.

8. The invention of claim 1 or 4 or 6 including means coupling the voltage controlled oscillator means to the phase detection means, and wherein the phase detection means includes means responsive to the pulses generated by the voltage controlled oscillator means for generating phase error signals in a predetermined time relationship to the pulses generated by the voltage controlled oscillator means.

9. In a phase locked loop for generating pulses at a frequency that is a fixed factor multiple of a reference frequency pulse train, the phase locked loop including phase detection means having a first input to which is communicated the reference frequency pulse train, integration means, voltage controlled oscillator means, and frequency division means including a counter, the improvement comprising:

value setting means for generating a binary code;

comparison means coupled to the value setting means and to the frequency divider counter for producing a pulse when the content of the frequency divider counter and the binary code of the value setting means are equal, the duration of the pulse being defined by successive counter transitions, the pulse being applied to a second input of the phase detection means; and means coupling the voltage controlled oscillator means to the phase detection means;

the phase detection means including means responsive to the pulse from the comparison means at a predetermined portion of the cycle of a pulse from the voltage controlled oscillator means that occurs within the duration of the pulse from the comparison means;

whereby the reading in the counter at a fixed arbitrary point in the cycle of the reference frequency pulse train may be adjusted to a desired value by adjustment of the value setting means.

10. The invention of claim 9 wherein the predetermined portion of the cycle of the pulse from the voltage controlled oscillator means is a falling edge.

11. The invention of claim 9 wherein the value setting means comprises a manually actuable switch having a plurality of positions and a plurality of output lines, each position producing a binary code on the output lines corresponding to the position.

12. In apparatus for electronically measuring the relative position between first and second relatively movable members, which apparatus includes means for generating first and second cyclical signals, the relative phase between which is a measure of the relative position, and means defining a feedback loop including a frequency division counter for generating a feedback signal in the loop, the counter content at a predetermined point in the cycle of the first cyclical signal providing a digital signal representative of the relative position, the improvement comprising:

means for electrically offsetting the feedback signal by an arbitrary desired number of counts in the counter in order to permit an arbitrary desired relative position measurement to be achieved for a given arbitrary relative position.

13. The invention of claim 12 wherein the feedback loop comprises a digitally closed phase locked loop including a counter, and wherein the means for offsetting the feedback signal comprises manually actuable means for varying the content of the counter at which the feedback signal is generated.

14. The invention of claim 13 wherein the means for varying the content of the counter comprises:

manually actuable value setting means for generating a binary code representative of the desired measurement; and comparison means coupled to the value setting means and to the counter for producing the feedback signal in response to a correspondence between the contents of the counter and the binary code of the value setting means.

15. A method of measuring the relative position between first and second relatively movable members based on the phase difference between first and second cyclical signals to permit an arbitrary desired position measurement to be achieved for a given arbitrary relative position comprising the steps of:

generating pulses at a frequency that is a fixed multiple of the frequency of the second cyclical signal;

counting the pulses between fixed points in the cycles of the first and second cyclical signals;

deriving a feedback signal from the pulses to maintain the pulse frequency at the fixed multiple;

electrically offsetting the timing of the feedback signal by a number of pulses representative of the arbitrary desired position measurement and given arbitrary relative position.

16. The method of claim 15 wherein the counting step utilizes a counter and wherein the deriving and offsetting steps together comprise the substeps of:

setting a binary code representative of the offset interval;

comparing the counter content with the binary code; and generating the feedback signal when a correspondence between the binary code and the counter content is detected.

* * * * *